(12) United States Patent
Schultz et al.

(10) Patent No.: US 6,208,057 B1
(45) Date of Patent: Mar. 27, 2001

(54) ELECTRICAL MACHINE WITH REDUCED AUDIBLE NOISE

(75) Inventors: Roy David Schultz, Dearborn; Shawn Swales, Canton, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/221,483

(22) Filed: Dec. 28, 1998

(51) Int. Cl.$^7$ .............................. H02K 19/28; H02K 3/16
(52) U.S. Cl. ........................ 310/182; 322/89; 310/51; 310/184
(58) Field of Search .......................... 310/183, 184, 310/179, 186, 197, 51; 322/46, 89, 71, 94, 58, 29, 66

(56) References Cited

U.S. PATENT DOCUMENTS

| 4,110,642 | 8/1978 | Thiele | 310/51 |
|---|---|---|---|
| 4,201,930 | 5/1980 | Inagaki et al. | 310/51 |
| 4,263,526 | 4/1981 | Taguchi et al. | 310/263 |
| 5,122,705 | 6/1992 | Kusase et al. | 310/68 B |
| 5,172,020 | 12/1992 | Hibino et al. | 310/26 |
| 5,256,926 | 10/1993 | Hagenlocher et al. | 310/259 |
| 5,691,590 | 11/1997 | Kawai et al. | 310/180 |
| 5,708,316 | 1/1998 | Ishida | 310/184 |

FOREIGN PATENT DOCUMENTS

| 55-122466 | 9/1980 | (JP) . | |
|---|---|---|---|
| 62-023348 | * 1/1987 | (JP) | 310/183 |

* cited by examiner

Primary Examiner—Karl Tamai
(74) Attorney, Agent, or Firm—Rhonda L. McCoy-Pfau

(57) ABSTRACT

An electrical machine includes one or more multiple-phase electrical power windings and an auxiliary winding. The auxiliary winding when closed generates electromagnetic fields which partially cancel fields generated during the operation of the electrical machine. The result is reduced audible noise from the electrical machine.

10 Claims, 2 Drawing Sheets

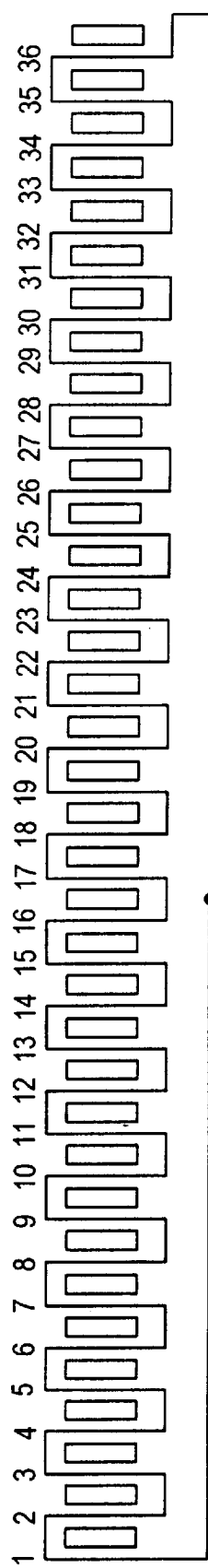
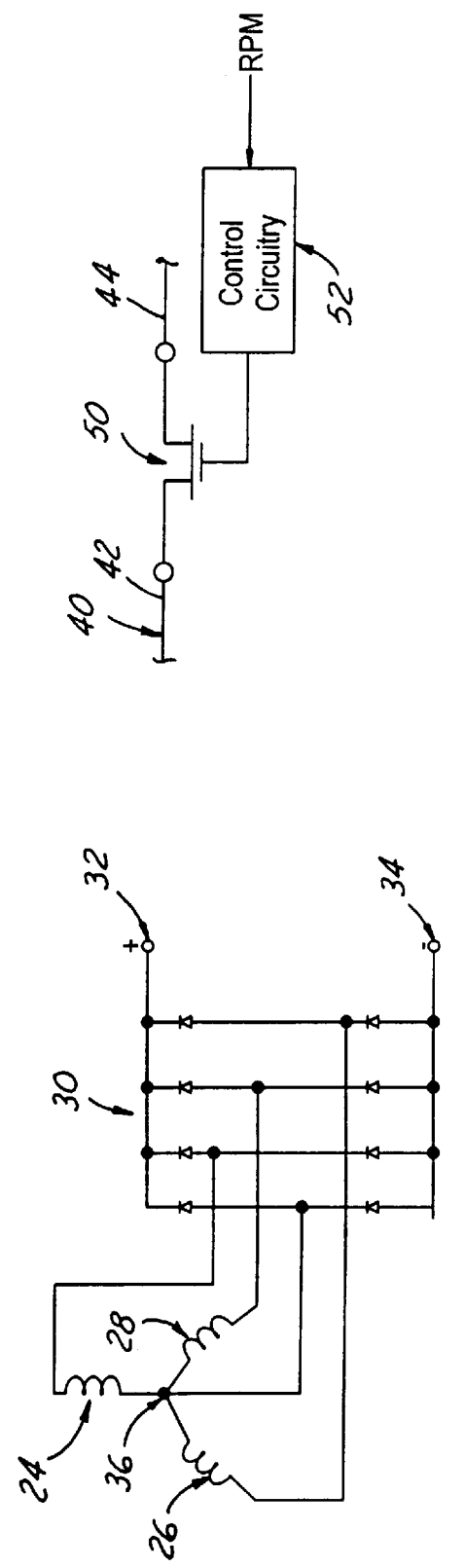
FIG. 3
FIG. 4
FIG. 2

ELECTRICAL MACHINE WITH REDUCED AUDIBLE NOISE

BACKGROUND OF THE INVENTION

1. Field of the Invention

The present invention relates to electrical machines and more particularly to noise reduction designs for electrical machines.

2. Description of the Related Art

In the design of electrical machines, reducing audible noise generated by operation of the machine can be important. One field in which noise reduction is particularly important is in the design of alternators for motor vehicles.

An important operating point at which it is very important for an alternator operate quietly is at engine idle. There, because the vehicle is otherwise relatively quiet due to low engine speed and the lack of wind and road noise, alternator noise can be particularly annoying to the occupants of the vehicle.

The audible noise produced by operation of an automotive claw pole alternator is partly electromagnetic in origin. In particular, a third-harmonic field can produce significant noise. In a common 12-pole alternator, this third harmonic field is a 36-pole field. The third harmonic field is due to the interaction of the magnetomotive force produced by the stator currents with the permanence of the air gap between the rotor and the stator.

Electrical machine designs which can reduce the audible noise generated by electromagnetic fields in the machine will provide significant advantages over the prior art. Particularly in the automotive environment, the advantage will be in the form of increased customer satisfaction.

SUMMARY OF THE INVENTION

The present invention provides an electrical machine comprising a rotor and a stator disposed in opposition to the rotor. The stator further comprises one or more multiple-phase electrical power windings coupled to receive or provide electrical power, and an auxiliary electrical winding. The rotor has "n" magnetic poles, and the auxiliary electrical winding is an "m•n"-pole winding, where "m" and "n" are integers.

The present invention further provides a method for controlling an electrical machine having a rotor and a stator, the stator further having one or more multiple-phase power windings and an auxiliary winding. The method comprises electrically closing the auxiliary winding under some operating conditions and electrically opening the auxiliary winding under other operating conditions. The operating conditions governing the opening and closing of the auxiliary winding can include rotational speed of the rotor of the electrical machine.

Electrical machines and control thereof according to the present invention can reduce the audible noise generated by the machine. In doing so, the present invention provides advantages over the prior art.

BRIEF DESCRIPTION OF THE DRAWINGS

FIG. 2 is an electrical schematic showing the power windings and rectifier of an electrical machine such as the alternator of FIG. 1.

FIG. 3 is a winding diagram for an auxiliary stator winding 40 according to one embodiment of the present invention.

FIG. 4 illustrates an electrical switch included for switchably opening and closing auxiliary stator winding 40 of FIG. 3.

DETAILED DESCRIPTION OF THE PREFERRED EMBODIMENT

Figure 1:
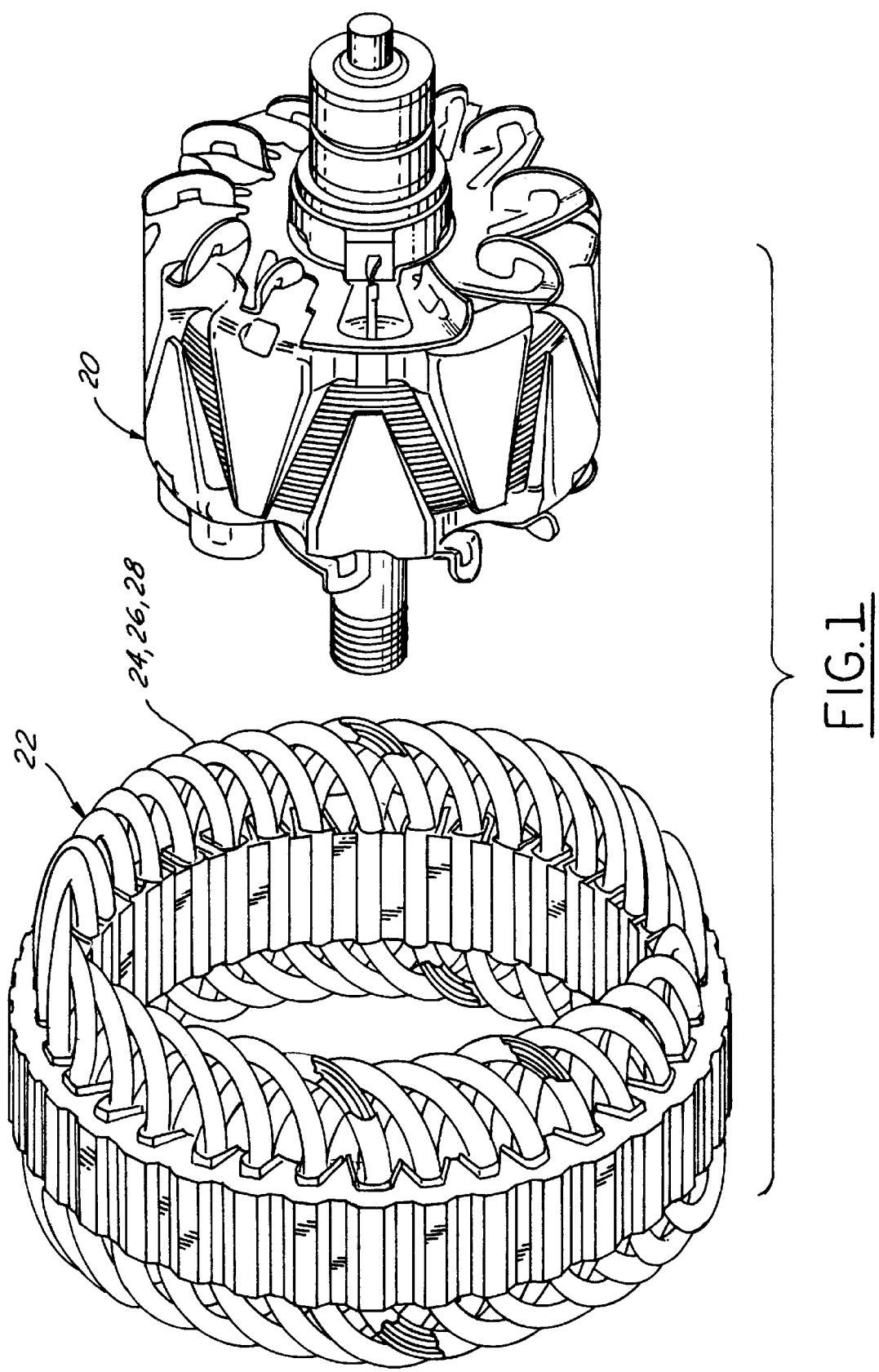
FIG. 1 is an exploded view showing a rotor and a stator of an electrical machine, in this case a claw pole alternator.

Refer first to FIGS. 1 and 2. An electrical machine according to this embodiment of the present invention includes a rotor 20 and a stator 22. Those skilled in the art will recognize rotor 20 as the rotor from a Lundell or "claw pole" alternator. In this case, rotor 20 has 12 magnetic poles. In this embodiment of the present invention, the alternator is a three-phase machine, with stator 22 having a three-phase winding comprising phase windings 24, 26 and 28. Alternating current electrical power is generated in windings 24, 26 and 28 when rotor 20 rotates. Bridge rectifier 30 rectifies the alternating current power generated in windings 24, 26 and 28, providing the rectified power to output terminals 32 and 34 of the electrical machine. Neutral connection 36 of windings 24, 26 and 28 is also connected to rectifier 30, in order to provide enhanced power output at high speed and high output current. Under these operating conditions, a third harmonic flux induces a third harmonic voltage in windings 24, 26 and 28. This voltage is of sufficient magnitude to cause the diodes coupled to neutral point 36 to conduct, thus providing enhanced electrical output.

Refer additionally to FIG. 3. Stator 22 further includes an auxiliary electrical winding 40, wound in the slots of stator 22 as shown. In this embodiment of the present invention, auxiliary winding 40 is a 36-pole winding (that is, it consecutively occupies each of the 36 slots in stator 22). Ends 42 and 44 of auxiliary winding 40 are preferably short-circuited.

The 36-pole third harmonic field generated by operation of the electrical machine induces a voltage in auxiliary winding 40. Because ends 42 and 44 of auxiliary winding 40 are short-circuited, the induced voltage causes a current to flow in auxiliary winding 40. This current generates a field which opposes and partially cancels the third harmonic flux, reducing the noise associated with third harmonic flux.

Refer additionally now to FIG. 4. One disadvantage of the use of auxiliary winding 40 is that the added output due to the neutral connection 36 of stator windings 24, 26 and 28 being connected to rectifier 30 is substantially lost, due to the reduction of the third harmonic flux by auxiliary winding 40. However, a switching device such as transistor 50 can be provided to control the short-circuiting of auxiliary winding 40. Thus, near idle (where the concern about alternator noise is the greatest and where noise associated with third harmonic flux can be a particularly large contributor), transistor 50 can be closed. This will short-circuit auxiliary winding 40 to provide the noise-reduction benefits described above. At higher engine speeds, transistor 50 can be opened, resuming the benefit of having neutral connection 36 coupled to rectifier 30. Suitable control circuitry 52, such as a microprocessor-based controller having access to engine RPM data, can be used to control transistor 50. Selection of transistor 50 can be facilitated by winding auxiliary winding 40 with multiple turns. Thus, less current will be required to provide its noise-reducing effect, and a lower-current-capacity transistor 50 can be selected.

Auxiliary winding 40 can be manufactured in various ways. First, it can be simply wound of wire in a conventional manner. It may also manufactured by providing electrically-conductive slot liners made of stamped metal such as copper. The slot liners can be inserted into the slots of stator 22 to line the bottom and/or sides of the slots. The slot liners are then electrically coupled together to create a one-turn auxiliary winding according to the winding diagram of FIG. 3. Stator phase windings 24, 26 and 28 are then wound into the slots of stator 22 in the conventional manner. Also, stator phase windings 24, 26 and 28 may be wound first, with conductive wedges then placed on top of the phase windings. The wedges can be electrically interconnected to create an auxiliary winding according to FIG. 3.

Laboratory testing has demonstrated that an auxiliary winding 40 according to the present invention can provide very substantial reductions in audible noise caused by third harmonic flux.

Various other modifications and variations will no doubt occur to those skilled in the arts to which this invention pertains. For example, the invention described herein is, of course, applicable to motors as well as generators. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electrical machine comprising:
   a rotor;
   a stator disposed in opposition to said rotor, said stator further comprising one or more multiple-phase electrical power windings coupled to receive or provide electrical power, and an auxiliary electrical winding having a plurality of turns and further having a first end and a second end;
   switching means coupled to said first end and said second end to switchably connect said first end and said second end;
   wherein said rotor has "n" magnetic poles; and
   said auxiliary electrical winding is an "m•n"-pole winding, where "m" and "n" are integers.

2. An electrical machine as recited in claim 1, wherein said auxiliary electrical winding has a first end and a second end, said first end and said second end electrically coupled together.

3. An electrical machine as recited in claim 1, wherein said first end and said second end are electrically short-circuited.

4. An electrical machine as recited in claim 1, wherein:
   said auxiliary electrical winding has a first end and a second end; and
   said electrical machine further comprises switching means coupled to said first end and said second end to switchably short-circuit said first end and said second end together.

5. An electrical machine as recited in claim 1, wherein:
   said auxiliary electrical winding has a first end and a second end; and
   said electrical machine further comprises switching means coupled to said first end and said second end to switchably connect said first end and said second end.

6. An electrical machine as recited in claim 1, wherein:
   said auxiliary electrical winding has a first end and a second end; and
   said electrical machine further comprises switching means coupled to said first end and said second end to switchably short-circuit said first end and said second end together.

7. An electrical machine as recited in claim 1, wherein said auxiliary electrical winding is a single-phase winding.

8. An electrical machine as recited in claim 1, wherein "m" is 3 and "n" is 12.

9. An electrical machine as recited in claim 1, wherein:
   said electrical machine is a generator; and
   said one or more multiple-phase electrical power windings are coupled to one or more bridge rectifiers.

10. An electrical machine as recited in claim 1, wherein said stator has exactly one said multiple-phase electrical power winding having "m" number of phases.

* * * * *